United States Patent [19]
Botkin et al.

[11] Patent Number: 5,114,169
[45] Date of Patent: May 19, 1992

[54] DROP FRAME TRUCK TRAILER

[75] Inventors: Lawrence A. Botkin; Mahmud K. Javadi, both of Omaha, Nebr.

[73] Assignee: Fruehauf Trailer Corporation, Southfield, Mich.

[21] Appl. No.: 731,302

[22] Filed: Jul. 16, 1991

Related U.S. Application Data

[63] Continuation of Ser. No. 538,186, Jun. 14, 1990, abandoned.

[51] Int. Cl.$^5$ .............................................. B62D 53/06
[52] U.S. Cl. .................................. 280/423.1; 280/400; 29/897.2; 296/30; 296/182
[58] Field of Search .............. 296/182, 30; 280/423.1, 280/407.1, 760, 901, 425.2, 400; 52/729; 29/897, 897.2; 428/544, 594

[56] References Cited

U.S. PATENT DOCUMENTS

| | | | |
|---|---|---|---|
| 1,413,918 | 4/1922 | Lamb | 29/897 |
| 2,590,181 | 3/1952 | Kessler | 214/85 |
| 2,590,210 | 3/1952 | Rogers | 214/85 |
| 2,678,188 | 5/1954 | Rogers | 254/86 |
| 2,759,737 | 8/1956 | Manning | 280/44 |
| 2,874,973 | 2/1959 | Botkin | |
| 2,963,302 | 12/1960 | Ronk | 280/425.2 |
| 3,030,126 | 4/1962 | Martin | 280/425.2 |
| 3,467,408 | 9/1969 | Regalia | 280/34 |
| 3,577,739 | 5/1971 | Botkin | |
| 3,703,301 | 11/1972 | Randle | 280/423.1 X |
| 3,843,161 | 10/1974 | Hastings | 280/423.1 |
| 3,929,353 | 12/1975 | Burleson et al. | 280/423.1 |
| 3,945,668 | 3/1976 | Holland | 280/423.1 |
| 4,009,889 | 3/1977 | Smith | 280/423.1 |
| 4,060,145 | 11/1977 | Kingman | 280/423.1 X |
| 4,096,960 | 6/1978 | Gilmore | 280/423.1 X |
| 4,168,847 | 9/1979 | Westphal | 280/423.1 |
| 4,262,923 | 4/1981 | Weir | 280/423.1 |
| 4,423,884 | 1/1984 | Gevers | 280/405 |

OTHER PUBLICATIONS

The Welding Institute Research Bulletin-"Fatigue Design Rules for Welded Steel Joints" (May 1976).

Primary Examiner—Charles A. Marmor
Assistant Examiner—Anne Marie Boehler
Attorney, Agent, or Firm—Willian Brinks Olds Hofer Gilson & Lione

[57] ABSTRACT

A drop frame trailer in which the vertical webs of the beams in the joints between the gooseneck portion and a vertically extending portion are reinforced by welding generally triangularly shaped, unitary reinforcing members to the inboard and outboard sides thereof. The preferred reinforcing member is generally triangularly shaped and has a generally triangularly shaped opening positioned generally centrally therein. An alternative reinforcing member is generally hourglass shaped with no central opening therein.

42 Claims, 2 Drawing Sheets

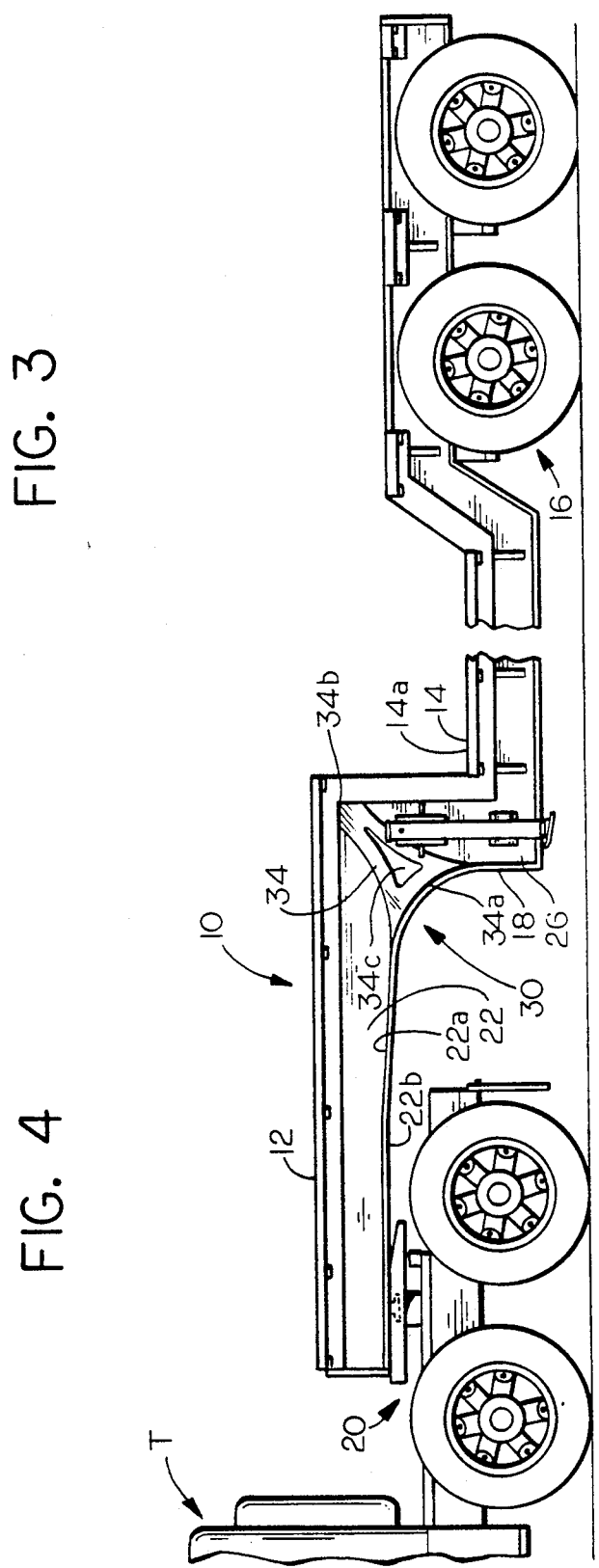

DROP FRAME TRUCK TRAILER

This is a continuation of copending application Ser. No. 07/538,136 filed on Jun. 14, 1990, now abandoned.

BACKGROUND OF THE INVENTION

1. Field Of The Invention

This relates to an improved truck trailer of the drop frame type. More particularly, this invention relates to an improvement in the vertically extending, reinforced joint between the elevated, horizontally extending gooseneck portion of such a trailer and the generally vertically extending member which extends between the rear of such gooseneck portion and the front of the dropped, generally horizontally extending main frame portion of the trailer.

2. Description Of The Prior Art

In a drop frame trailer the joint between the rear of the gooseneck portion and the top of the vertically extending member to which it is attached, which is formed by beam members that have vertically extending web portions, can be subjected to very large bending loads, and these loads are repeatedly changed in magnitude during the movement of the trailer along a highway. Thus, these joints are subject to fatigue failure if not properly designed and fabricated. Heretofore, such joints have been fabricated from large, structural steel members, and have been reinforced by welding two or more diverging, linearly extending steel bars to vertically extending members on the inboard and outboard sides of the joint. However, finite element stress analysis techniques indicate that this design places the welds between the bars and the joint at or near the locations of maximum stress in the joint, making the welds subject to fatigue failure.

SUMMARY OF THE INVENTION

In accordance with the present invention, an improved reinforced joint between a gooseneck member of a drop frame truck trailer and the vertically extending member to which it is attached is obtained by welding a single, stamped metal piece to each of the inboard and outboard sides of the joint. The reinforcing member is generally triangularly shaped in its outline and it may have a generally triangular central opening therein. It is welded to the underlying joint member along its outer periphery and along its inner periphery. Finite element stress analysis techniques indicate that the welds between such reinforcing piece and the underlying joint members are away from the locations of maximum stress in the joint. Thus, a joint reinforced in this manner is less subject to fatigue failure than its prior art counterparts. Further, the use of such a reinforcing technique eliminates the need for small welds at the ends of reinforcing bars of a prior art joint, and the making of these welds is difficult in a production operation.

Accordingly, it is an object of the present invention to provide an improved truck trailer of the drop frame type. More particularly, it is an object of the present invention to provide a truck trailer of the drop frame type with an improved reinforced joint between the rear of the gooseneck portion thereof and the top of a generally vertically extending member which extends from the gooseneck portion to the front of the main frame portion of the trailer.

For a further understanding of the present invention and its objects, attention is directed to the drawing and the following brief description thereof, to the detailed description of the preferred embodiment and to the appended claims.

BRIEF DESCRIPTION OF THE DRAWING

FIG. 1 is an elevational view of a drop frame trailer according to a preferred embodiment of the present invention, with a portion of such trailer being broken away to permit the trailer to be illustrated at a larger scale, the trailer of FIG. 1 being illustrated in attachment to the fifth wheel of a conventional truck tractor T for towing thereby;

FIG. 3 is a sectional view taken on line 3—3 of FIG. 2; and

FIG. 4 is a fragmentary view which is similar to a portion of the view of FIG. 1 and which illustrates a modified embodiment of the present invention.

DETAILED DESCRIPTION OF THE PREFERRED EMBODIMENT

Figure 2:
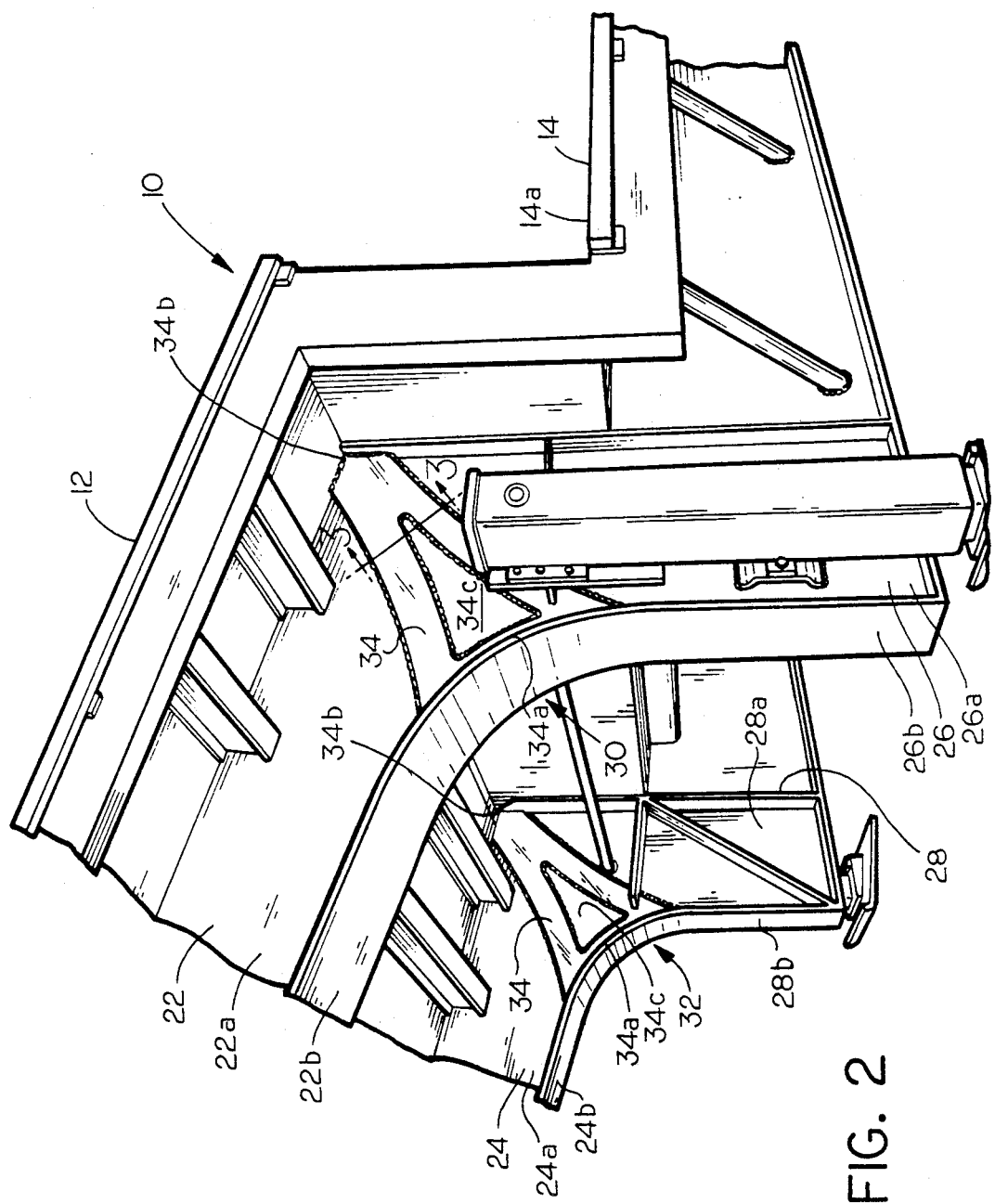
FIG. 2 is a fragmentary perspective view, at an enlarged scale relative to FIG. 1, which illustrates additional details of the trailer.

A truck trailer according to the preferred embodiment of the present invention is identified generally by reference numeral 10 in FIGS. 1 and 2 of the drawing. The trailer 10 includes a generally horizontally extending gooseneck portion 12, a generally horizontally extending main frame portion 14 and running gear means 16 which is affixed to the main frame portion 14 near the rear end thereof. Generally vertically extending beam means 18 is secured to and extends from the rear end of the gooseneck portion 12 to the main frame portion 14, and serves to join the portions 12 and 14 into a rigid, unitary structure. As is clear from FIG. 1, the elevation of at least a substantial forward portion 14a of the main frame portion 14 is substantially lower than the elevation of the gooseneck portion 12, to thereby permit the trailer 10 to carry loads of substantial vertical height, for example, large steel tanks, on the forward portion 14a without violating maximum vertical clearance restrictions. The gooseneck portion 12 carries means 20 by which it may be disengageably attached to the fifth wheel of a truck tractor T, by which the trailer may be towed over a generally horizontal surface such as a road or a highway.

The gooseneck portion 12 of the trailer 10 includes longitudinally extending beam members 22, 24 on opposed sides thereof, and it further includes vertically extending beam members 26, 28 which are longitudinally aligned with beam members 22, 24, respectively, and which are joined thereto. The beams 22, 24 have generally vertically extending web portions 22a, 24a, respectively, each of which extends for a substantial vertical distance to provide adequate strength and rigidity. To that end, the beams are preferably fabricated from steel, and preferably from a weldable grade thereof. The beam members 22, 24 further have transversely extending bottom flanges 22b, 24b, respectively, at the bottoms thereof to further increase the strength and rigidity thereof, under a load applied along the webs 22a, 24a, respectively, and under side loads applied transversely thereof. Preferably, the web portion 22a and the flange portion 22b of the beam member 22 are formed integrally with one another, and the web portion 24a and the flange portion 24b of the beam member 24 are formed integrally with one another.

The beam members 26, 28 have vertically extending web portions 26a, 28a, respectively, which are longitudinally aligned with the web portions 22a, 24a of the beam members 22, 24, respectively, and which merge thereinto to form unitary structures. The beam members 26, 28 further have transversely extending flanges 26b, 28b, respectively, which are aligned with the flanges 22b, 24b of the beam members 22, 24, respectively. As illustrated, the juncture between the flanges 22b and 26b occurs over a relatively large radius and the juncture between the flange 24b and 28b also occurs over a relatively large radius to avoid undue stress concentrations at such junctures. Thus, joints, which are generally identified by reference numerals 30, 32, are formed at the juncture of the beam members 22 and 26 and at the juncture of the beam members 24 and 28, respectively.

Each of the joints 30, 32 is reinforced by securing a unitary reinforcing member 34 to the inboard and outboard surfaces of the aligned web portions 22a, 26a, and 24a, 28a, respectively. When the beam members 22, 26, 24, 28 are fabricated from a weldable steel, in accordance with the preferred embodiment of the invention as heretofore explained, the reinforcing members 34 are also preferably formed from a weldable steel, for example, by stamping, and the members 34 are then preferably secured in their respective positions by welding.

As is illustrated in FIGS. 1 and 2, each of the members 34 has an outer configuration which is generally that of an isosceles triangle, with a base 34a that is somewhat shorter than the other, equal sides. Further, each of the members 34 has an apex 34b which is formed at the junctures of the other, equal sides thereof. The apex 34b of each member 34 is positioned at a higher elevation than the base thereof, and a line from the apex 34b to the midpoint of the base 34a of each member 34 generally bisects the included angle of the joint 30, 32, as the case may be; that is, such line extends at an angle of approximately 45° when the members 22, 26 and 24, 28, respectively, are at right angles to each other.

Each reinforcing member 34 may also have an opening 34c positioned centrally therein, and the opening 34c serves to increase the length of the weld between the member 34 and the underlying beam members, 22, 26 or 24, 28, as the case may be. Each opening 34c also has a configuration which is generally that of an isosceles triangle, with each side of the opening being generally parallel with an outer side of the member 34. In actuality, because of the large radius at the junctures of the flanges 22b, 26b and 24b, 28b, as heretofore explained, the base 34a of each member 34 is preferably concave to follow the curvature of the flanges 22b, 26b or 24b, 28b, as the case may be, so that the member 34 can extend substantially to such flanges for maximum effectiveness. Similarly, the other, equal legs of each of the members 34 slightly concave, that is, concave with a relatively long radius of curvature. Thus, each member 34 has the general exterior appearance of an inverted, inclined wineglass or vase.

When the beam members 22, 26 and 24, 28 and the reinforcing members 34 are formed of a weldable steel, the reinforcing members are preferably secured by welding to the beam members 22, 26 or 24, 28, as the case may be, and this preferably is done both along the outer edge of each reinforcing member 34 and along the inner edge thereof which defines the opening 34c therein. Preferably, the weld along the inner edge of each opening 34c is continuous and the welding along the outer edge of each member is continuous at least between a pair of closely spaced points on the opposite sides of the apex 34b, thereof.

FIG. 4 illustrates a truck trailer 110 according to an alternative embodiment of the present invention. The truck trailer 110 of FIG. 4 is the same in all important respects as the truck trailer 10 of FIGS. 1 and 2, except that the truck trailer 110 incorporates an alternative embodiment of a reinforcing member, element 134. The reinforcing member 134 has no central opening therein corresponding to the central opening 34c of the reinforcing member. Thus, the sides 134d, , 134e of the reinforcing member 134 need not be spaced apart as far as would be the case if there were a central opening therebetween, and this results in a reinforcing member with an outer configuration that is generally similar to an hourglass. Because of the lack of a central opening, the reinforcing element provides less lineal distance for welding it to its underlying member than a reinforcing element 34 of comparable size, but in many cases it can still be suitably welded to an underlying member when both such members are formed of weldable steel.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A trailer comprising, in combination:
a first generally horizontally extending member having a first end and a second end and a generally vertically extending web, said first generally horizontally extending member further having a bottom flange extending generally transversely of said web, said first end being adapted to be disengageably attached to a fifth wheel of a truck tractor;
a second generally horizontally extending member having a first end and a second end, said second generally horizontally extending member being positioned at a lower elevation than said first generally horizontally extending member and having its first end generally vertically aligned with said second end of said first generally horizontally extending member;
a generally vertically extending member having an upper end secured to said first generally horizontally extending member at a location adjacent said second end of said first generally horizontally extending member, said generally vertically extending member further having a lower end secured to said second generally horizontally extending member at a location adjacent said first end of said second generally horizontally extending member, a generally vertically extending web and a flange extending generally transversely of said web of said generally vertically extending member;
said generally vertically extending member forming a joint with said first generally horizontally extending member, said joint having an inboard side and an outboard side, said generally vertically extending web of said generally vertically extending member being aligned with said generally vertically extending web of said first generally horizontally extending member and said flange of said generally vertically extending member being aligned with said flange of said first generally horizontally extending member;

running gear means affixed to said second generally horizontally extending member at a location adjacent said second end thereof, said running gear means permitting said trailer to be drawn over a road or highway when said trailer is affixed to a truck tractor; and a planar reinforcing element secured to one of said inboard side and said outboard side of said joint in surface to surface engagement with said web of said generally vertically extending member and said web of said first generally horizontally extending member, said reinforcing element having a generally triangular outline and having an edge extending substantially to said flange of said first generally horizontally extending member and substantially to said flange of said generally vertically extending member and serving to reinforce said joint against bending loads resulting from a load imposed on said generally horizontally extending member at a location between the first and seconds ends thereof.

2. A trailer according to claim 1 wherein said reinforcing element has generally triangular opening positioned therein, said reinforcing element having an apex and a base, said apex being positioned at a higher elevation than said base.

3. A trailer according to claim 2 wherein said opening is positioned generally centrally of said reinforcing element and is generally similar in the shape of its periphery to the shape of the outside periphery of said reinforcing element.

4. A trailer according to claim 2 wherein a line from said apex to the midpoint of said base substantially bisects the angle between said first generally horizontally extending member and said generally vertically extending member.

5. A trailer according to claim 3 wherein a line from said apex to the midpoint of said base substantially bisects the angle between said first generally horizontally extending member and said generally vertically extending member.

6. A trailer according to claim 3 wherein a line from said apex to the midpoint of said base substantially bisects the angle between said first generally horizontally extending member and said generally vertically extending member.

7. A trailer according to claim 1 and further comprising:

a second reinforcing element secured to the other of said inboard side and said outboard side of said joint in surface to surface engagement with said web of said generally vertically extending member and said web of said first generally horizontally extending member, said second reinforcing element having a generally triangular outline and having an edge extending substantially to said flange of said first generally horizontally extending member and substantially to said flange of said generally vertically extending member and serving to further reinforce said joint against such bending loads.

8. A trailer according to claim 2 and further comprising:

a second reinforcing element secured to the other of said inboard side and said outboard side of said joint in surface to surface engagement with said web of said generally vertically extending member and said web of said generally horizontally extending member, said second reinforcing element having a generally triangular outline and having an edge extending substantially to said flange of said first generally horizontally extending member and substantially to said flange of said generally vertically extending member and serving to reinforce said joint against bending loads resulting from a load imposed on said second generally horizontally extending member at a location between the first and second ends thereof.

9. A trailer according to claim 8 wherein said second reinforcing element generally triangular opening therein, said second reinforcing element having an apex and a base, said apex of said second reinforcing element being positioned at a higher elevation than said base thereof.

10. A trailer according to claim 9 wherein said opening in said second reinforcing element is positioned generally centrally thereof and is generally similar in the shape of its periphery to the shape of the outside periphery of said second reinforcing element.

11. A trailer according to claim 1 wherein each of said first generally horizontally extending member, said vertically extending member, and said reinforcing element is formed from steel, and wherein said reinforcing element is secured to said one of said inboard side and said outboard side by welding.

12. A trailer according to claim 2 wherein each of said first generally horizontally extending member, said vertically extending member, and said reinforcing element is formed from steel, and wherein said reinforcing element is secured to said one of said inboard side and said outboard side by welding.

13. A trailer according to claim 7 wherein said reinforcing element is secured to said one of said inboard side and said outboard side of said joint by welding substantially continuously around the outside periphery thereof.

14. A trailer according to claim 8 wherein said second reinforcing element is secured to said one of said inboard side and said outboard side of said joint by welding substantially continuously around the outside periphery thereof.

15. A trailer according to claim 14 wherein said second reinforcing element is further secured to said one of said inboard side and said outboard side of said joint by welding substantially continuously around said opening thereof.

16. A trailer according to claim 4 wherein each of said first generally horizontally extending member, said vertically extending member, and said reinforcing element is formed from steel, and wherein said reinforcing element is secured to said one of said inboard side and said outboard side by welding.

17. A trailer according to claim 16 wherein said reinforcing element is secured to said one of said inboard side and said outboard side of said joint by welding substantially continuously around the outside periphery thereof.

18. A trailer according to claim 5 wherein said reinforcing element is secured to said one of said inboard side and said outboard side of said joint by welding substantially continuously around the outside periphery thereof.

19. A trailer according to claim 18 wherein said reinforcing element is further secured to said one of said inboard side and said outboard side of said joint by welding substantially continuously around said opening thereof.

20. A trailer according to claim 7 wherein each of said first generally horizontally extending member, said reinforcing element, and said second reinforcing element is formed from steel, wherein said reinforcing element is secured to said one of said inboard side and said outboard side by welding, and wherein said second reinforcing element is secured to said other of said inboard side and said outboard side by welding.

21. A trailer according to claim 8 wherein each of said first generally horizontally extending member, said reinforcing element, and said second reinforcing element is formed from steel, wherein said reinforcing element is secured to said one of said inboard side and said outboard side by welding, and wherein said second reinforcing element is secured to said other of said inboard side and said outboard side by welding.

22. A trailer according to claim 20 wherein said reinforcing element is secured to said one of said inboard side and said outboard side of said joint by welding substantially continuously around the outside periphery thereof, and where said second reinforcing element is secured to said other of said inboard side and said outboard side of said joint by welding substantially continuously around the periphery thereof.

23. A trailer according to claim 21 wherein said reinforcing element is secured to said one of said inboard side and said outboard side of said joint by welding substantially continuously around the outside periphery thereof, and where said second reinforcing element is secured to said other of said inboard side and said outboard side of said joint by welding substantially continuously around the periphery thereof.

24. A trailer according to claim 10 wherein each of said first generally horizontally extending member, said reinforcing element, and said second reinforcing element is formed from steel, wherein said reinforcing element is secured to said one of said inboard side and said outboard side by welding, and wherein said second reinforcing element is secured to said other of said inboard side and said outboard side by welding.

25. A trailer according to claim 21 wherein said reinforcing element is secured to said one of said inboard side and said outboard side of said joint by welding substantially continuously around the outside periphery thereof, and where said second reinforcing element is secured to said other of said inboard side and said outboard side of said joint by welding substantially continuously around the periphery thereof.

26. A trailer according to claim 25 wherein said reinforcing element is further secured to said one of said inboard side and said outboard side of said joint by welding substantially continuously around said opening therein.

27. A trailer according to claim 7 wherein each of said first generally horizontally extending member, said reinforcing element, and said second reinforcing element is formed from steel, wherein said reinforcing element is secured to said one of said inboard side and said outboard side by welding, and wherein said second reinforcing element is secured to said other of said inboard side and said outboard side by welding.

28. A trailer according to claim 8 wherein each of said first generally horizontally extending member, said reinforcing element, and said second reinforcing element is formed from steel, wherein said reinforcing element is secured to said one of said inboard side and said outboard side by welding, and wherein said second reinforcing element is secured to said other of said inboard side and said outboard side by welding.

29. A trailer according to claim 27 wherein said reinforcing element is secured to said one of said inboard side and said outboard side of said joint by welding substantially continuously around the outside periphery thereof, and where said second reinforcing element is secured to said other of said inboard side and said outboard side of said joint by welding substantially continuously around the periphery thereof.

30. A trailer according to claim 28 wherein said reinforcing element is secured to said one of said inboard side and said outboard side of said joint by welding substantially continuously around the outside periphery thereof, and where said second reinforcing element is secured to said other of said inboard side and said outboard side of said joint by welding substantially continuously around the periphery thereof.

31. A trailer according to claim 29 wherein said reinforcing element is further secured to said one of said inboard side and said outboard side of said joint by welding substantially continuously around said opening therein.

32. A trailer according to claim 30 wherein said reinforcing element is further secured to said one of said inboard side and said outboard side of said joint by welding substantially continuously around said opening therein.

33. A trailer according to claim 2 wherein the outline of said reinforcing element is generally that of an isosceles triangle with a base which is substantially shorter in length than the other sides thereof.

34. A trailer according to claim 33 wherein each of the legs of said reinforcing element is concave.

35. A trailer according to claim 8 wherein the outline of said reinforcing element is generally that of an isosceles triangle with a base which is substantially shorter in length than the other sides thereof.

36. A trailer according to claim 35 wherein each of the legs of said reinforcing element is concave.

37. A trailer according to claim 8 wherein the outline of said reinforcing element is generally that of an isosceles triangle with a base which is substantially shorter in length than the other sides thereof, and wherein the outline of said second reinforcing element is generally that of an isosceles triangle with a base which is substantially shorter in length than the other side thereof.

38. A trailer according to claim 37 wherein each of the legs of said reinforcing element is concave, and wherein each of the legs of said second reinforcing element is concave.

39. A trailer according to claim 14 Wherein the outline of said reinforcing element is generally that of an isosceles triangle with a base which is substantially shorter in length than the other sides thereof, and wherein the outline of said second reinforcing element is generally that of an isosceles triangle with a base which is substantially shorter in length than the other side thereof.

40. A trailer according to claim 39 wherein each of the legs of said reinforcing element is concave, and wherein each of the legs of said second reinforcing element is concave.

41. A trailer according to claim 1 wherein said reinforcing element has no central opening therein.

42. A trailer according to claim 41 wherein said reinforcing element has an hourglass shaped opening therein.

* * * * *